United States Patent
Zhang et al.

(10) Patent No.: US 12,340,621 B2
(45) Date of Patent: Jun. 24, 2025

(54) SYSTEM AND METHOD FOR DETECTING AN OBJECT WITHIN AN IMAGE

(71) Applicant: OmniVision Technologies, Inc., Santa Clara, CA (US)

(72) Inventors: Wenchao Zhang, Fremont, CA (US); Guansong Liu, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 522 days.

(21) Appl. No.: 17/881,923

(22) Filed: Aug. 5, 2022

(65) Prior Publication Data

US 2024/0046696 A1 Feb. 8, 2024

(51) Int. Cl.
G06V 10/22 (2022.01)
G06V 10/24 (2022.01)
G06V 10/75 (2022.01)
G06V 40/16 (2022.01)

(52) U.S. Cl.
CPC ............ G06V 40/162 (2022.01); G06V 10/22 (2022.01); G06V 10/242 (2022.01); G06V 10/751 (2022.01)

(58) Field of Classification Search
None
See application file for complete search history.

(56) References Cited

U.S. PATENT DOCUMENTS

| 10,896,318 B2 | 1/2021 | Gernoth et al. |
| 11,804,025 B2 * | 10/2023 | Rainbow .............. G06V 10/454 |
| 2021/0185266 A1 | 6/2021 | Chan et al. |
| 2021/0342578 A1 | 11/2021 | Pezzaniti et al. |

FOREIGN PATENT DOCUMENTS

EP 3885965 A1 9/2021

OTHER PUBLICATIONS

Bourdev et al., "Robust Object Detection Via Soft Cascade", Proceedings, IEEE Computer Society Conference on Computer Vision and Pattern Recognition, vol. 2, Jul. 2005, 8 pages.
Chen et al., "XGBoost: A Scalable Tree Boosting System", Proceedings of the 22nd ACM SIGKDD International Conference on Knowledge Discovery and Data Mining, Aug. 2016, 10 pages.

* cited by examiner

*Primary Examiner* — Dov Popovici
(74) *Attorney, Agent, or Firm* — COZEN O'CONNOR

(57) ABSTRACT

A method of detecting an object in an image includes (i) processing, with a machine-learned model, pixel intensities of a pixel pair in a first region of the image, to determine a first confidence score representing a likelihood of the object being present within the first region, and (ii) determining, based on the first confidence score, presence of the object in the first region.

20 Claims, 10 Drawing Sheets

SYSTEM AND METHOD FOR DETECTING AN OBJECT WITHIN AN IMAGE

BACKGROUND

Camera modules in commercial products such as stand-alone digital cameras, mobile devices, automotive components, and medical devices include an image sensor having a pixel array. The pixel array includes a plurality of pixels arranged as a two-dimensional array. Pixel intensity is a critical feature used for classifying information stored within pixels. The intensity of a pixel is typically represented as a numerical value for gray-level images or three numerical values for color images. Current smart devices include cameras that can authenticate a user based on a user's biometric data. For example, a user can capture an image of herself with the smart device camera to unlock the smart device for use. Sophisticated authentication processes have power requirements that are unattainable or impractical for mobile devices.

SUMMARY OF THE EMBODIMENTS

Embodiments disclosed herein utilize a significantly reduced amount of power for identifying a particular object, such as a user's face, in an image at least in part by using a machine-learned model to streamline the identification process for the captured image.

In a first aspect, a method of detecting an object in an image includes (i) processing, with a machine-learned model, pixel intensities of a pixel pair in a first region of the image, to determine a first confidence score representing a likelihood of the object being present within the first region, and (ii) determining, based on the first confidence score, presence of the object in the first region.

In a second aspect, a system for detecting an object within an image includes a processor and a memory. The memory is communicatively coupled with the processor and includes storing machine-readable instructions that, when executed by the processor, cause the processor to execute the method of the first aspect.

DETAILED DESCRIPTION OF THE EMBODIMENTS

Figure 1:
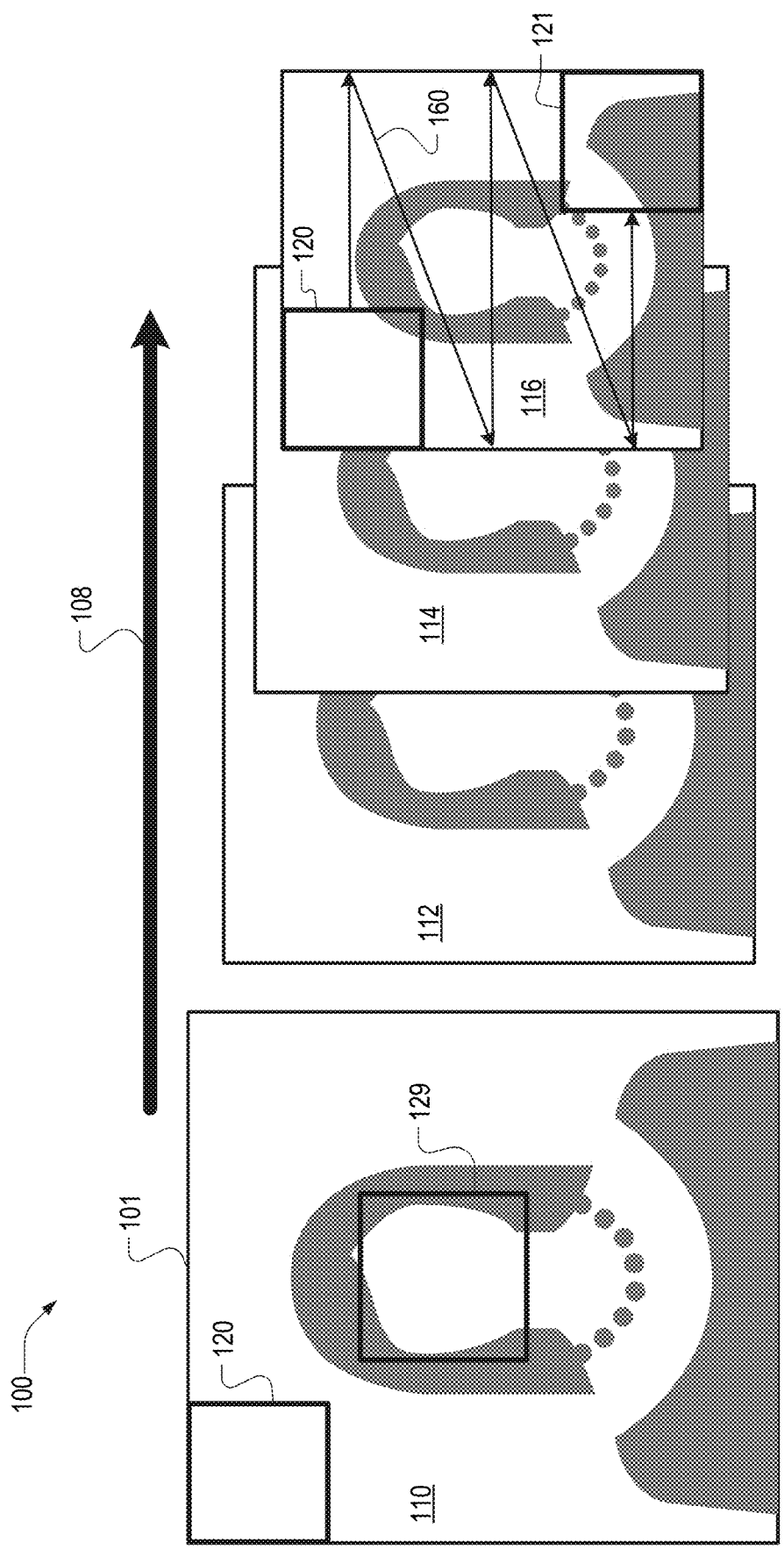
FIG. 1 is a diagram illustrating a scaled image and a resulting scanned sub-window of the image, in an embodiment.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise.

Embodiments disclosed herein illustrate low-power object detection in an image capable of rapid and accurate processing. For example, modern smart devices grant a user access upon facial or biometric recognition. A user may position the smart device in such a way to capture an image of the user's face. The smart device must determine which area of a captured image the user's face is before determining the user is authenticated to access the smart device. A captured image of the user's face may have the face rotated. While object (such as a face) detection is based on machine learning, object detection in rotated images does not require additional training.

Present embodiments highlight at least three key factors. The first factor is a new feature representation referred to as "pixel pair difference in gray value," which allows features within a captured image to be computed quickly and at low-power cost. The second factor is the applicability of an object detection method in rotated images (as discussed with reference to FIG. 3) without having to train for the specific orientation of the rotated images. This largely reduces the space complexity as the classifiers (discussed with reference to at least FIG. 4) do not require additional training or storage in memory. A lookup table can be further reduced by its space complexity. The third factor is a learning algorithm, such as extreme gradient boosting (XGBoost), which selects a small number of critical visual features from a large set and yields extremely efficient classifiers. To quickly discard the background regions of the image, soft-cascade is conducted on the learned classifiers. The total power cost may be, for example, 1.654 mW at no less than 5 fps, clock at 150 MHz.

The object detection algorithm may be run on a smartphone, laptop, or any smart or electronic device with a camera and where applications such as auto-wake and auto-sleep require facial recognition with low power consumption, or a surveillance system such as true alarm with person or face presence detection with high accuracy. The algorithm enables sensor-based low-power face detection, meeting the requirements of less than 10 milliwatts and can identify facial characteristics with up to a 360° rotation.

FIG. 1 is a diagram 100 illustrating a scaled image and a resulting scanned sub-window of the image, in an embodiment. Diagram 100 includes an image 101 that may be captured, for example, by a smartphone having a camera. Image 101 may be converted to a grayscale image prior to further processing described below. In this embodiment, the image 101 is scaled to a series of images 110, 112, 114, 116 with successively lower resolution. However, the scaling of images to lower resolution is not required. The present embodiments may be used on any resolution. Beginning with an image (not shown) that has, for example, a resolution of 4672×3504 (height×width), the image is reduced to image 110 with a lower resolution of, for example, 120×160. A series of further reduced images are created with successively lower resolutions, such as image 112 with a resolution of 96×128, image 114 with a resolution of 39×52, and image 116 with a resolution of 25×33. Direction 108 shows series of images 110-116, with each image reducing in resolution. There may be additional or fewer images with different resolutions than the resolutions shown.

The present embodiments scan a small image (sub-window) within each image to detect an object within the image. For example, the sub-window 129 overlays the object (a face) that is the object of detection. An area for each scan is depicted by sub-window 120. Further, the series of scanned sub-windows 120 proceeds along path 160 throughout image 116, ending at sub-window 121. In an embodiment, when sub-window reaches the right most end of the image, the scan resumes on the left most end below where the previous scan occurred and again traces horizontally across the image. The scan pattern of an image is not limited to path 160, but may take any path, such as an opposite path to path 160, or rather than from left to right and up to down, as shown by path 160, may take a path proceeding from down to up and left to right.

Each sub-window 120 is evaluated by a classifier (discussed with reference to at least FIG. 4) that is run to determine the confidence of each pixel being a face (such as by matching a grayscale of complexion). While this process of scanning a sub-window in an image may be implemented for any size image without departing from the scope hereof, it may be advantageous to implement the method in reduced resolution images, such as image 116, for speed and low-power consumption while maintaining high accuracy. After an image is scanned, the algorithm returns a sub-window that covers the face and includes a size and position of the face. The first sub-window to be evaluated in FIG. 1 may be sub-window 120, and the final sub-window to be evaluated may be sub-window 121.

Figure 2:
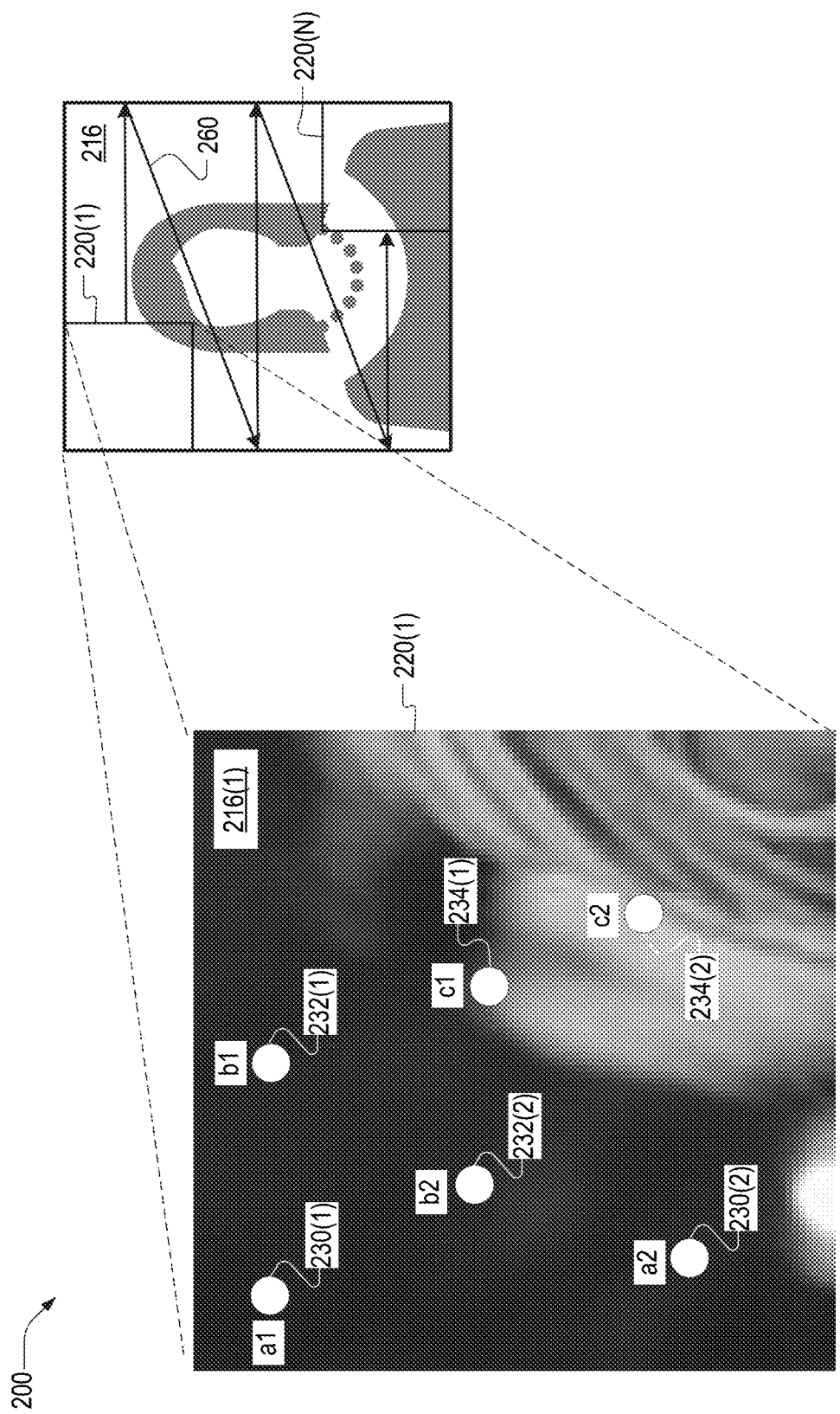
FIG. 2 shows an example of pixel pairs in sub-window in image, such as pixel pairs (a1, a2), (b1, b2), and (c1, c2), in an embodiment.

FIG. 2 shows an example of pixel pairs in sub-window 220(1) in image 216, e.g., pixel pairs (a1, a2), (b1, b2), and (c1, c2). Sub-window 220(i), where i is a positive integer, is an example of sub-window 120. Pixel pairs taken from a grayscale format and the difference in intensity allow evaluation of the image to be performed with reduced complexity offering greater speed and at lower power. Initially the pixel pairs may be taken at random but are not limited to random selection. The image, and pixel pairs 230(1), (2), 232(1), (2), and 234(1), (2) may be grayscale to reduce power and processing requirements. In FIG. 2, an image sub-window 220(1) may be used as a training sample with a resolution of 24×24. Spatial dimensions of sub-window 220(1) may be predetermined. There may be many candidate pairs, i.e., the number of combinations to select 2 from 576, which is 165,600. So, it is a quite large feature pool. To speed up the training, random candidate pairs set may be used. The random candidate pixel pairs will apply to all the training samples of positive and negative. The pixel intensity difference between each of the pixel pairs 230-234 will be input to a training algorithm. The grayscale intensity differences, which may be represented as 230(1) a1-230(2) a2, 232(1) b1-232(2) b2, 234(1) c1-234(2) c2, that are taken from 220(1) in image 216, are repeated for each sample sub-window 220(1) through 220(N) along path 260. Pixel pairs 230-234 may be picked at random. Or, an alternate method of selecting pixel pairs may be used. A training algorithm, such as XGBoost, may be used as the training algorithm for evaluation of the grayscale pixel-intensity differences to detect objects within an image. Training algorithm XGBoost is well known to those of ordinary skill in the art.

The features and classifiers will be learned, which are a sequence of binary trees (discussed with reference to FIG. 5). To make the classifiers more robust, the classifiers may be further trained by soft-cascade, as described in Robust Object Detection via Soft Cascade, Lubomir Bourdev, and Jonathan Brandt, Proceedings, IEEE Computer Society Conference on Computer Vision and Pattern Recognition, July 2005, Pages 236-243, vol. 2, and is hereby incorporated by reference.

As discussed above with respect to facial recognition, a smart phone may require an authenticated user's biometric data for access. The user may not correctly orient the camera such that the facial dimensions are aligned with the image sensor. For example, a user's face may be rotated at such an angle that facial detection is difficult.

Figure 3:
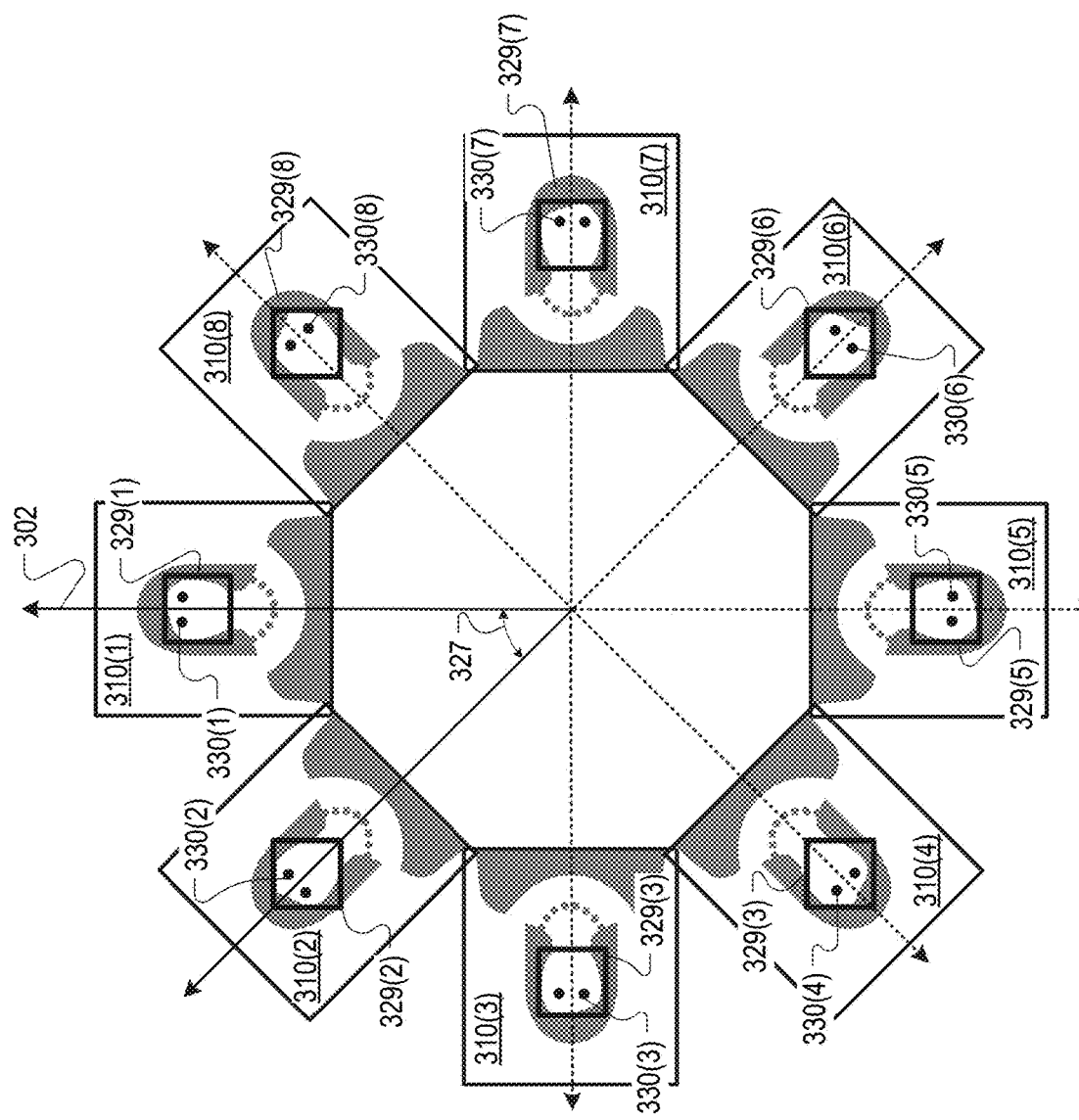
FIG. 3 is a diagram illustrating a set of images, each including a sub-window overlaying a face, shown at various angles of rotation about a reference line, in an embodiment.

FIG. 3 is a diagram illustrating images 310(1)-(8), each including a sub-window overlaying a face, shown at various angles of rotation about a reference line 302. Image 310(1), with sub-window 329(1), shows a position of a face between 22.5 and −22.5 degrees of rotation from a 0° reference line 302. Within sub-window 329(1) is a reference point 330(1), which is a right eye of an individual within image 310(1). Rotating image 310(1) by 90-degree counterclockwise intervals from reference line 302 results in images 310(3), 310(5), and 310(7), with respective sub-windows 329(3), 329(5), and 329(7), along with reference points 330(3), 330(5), and 330(7). The various angle used in in the image rotations determine the series of classifiers that are used in facial determination. These are important in the use of functions such as unlocking a cell phone in which the phone may be at a different angle, at different times. The number of angles of rotation may be more or fewer within the scope of the embodiment.

Likewise, image 310(2) includes sub-window 329(2) positioned over face of image 310(2) centered at angle 327 (such as 45 degrees), that is between −22.5 degrees and −67.5 degrees. Within sub-window 329(2) is a reference point 330(2), which is a left eye of an individual within image 310(2). Rotating image 310(2) by 90 degrees counterclockwise intervals from reference line 302 results in images 310(4), 310(6), and 310(8), with respective sub-windows 329(4), 329(6), and 329(8), along with reference points 330(4), 330(6), and 330(8). The face within sub-windows 329(3)-329(8) can be derived by rotating image either of images 310(1) or 310(2) by various angles (such as forty-five degrees). In each case, a new processing is not needed.

Figure 4:
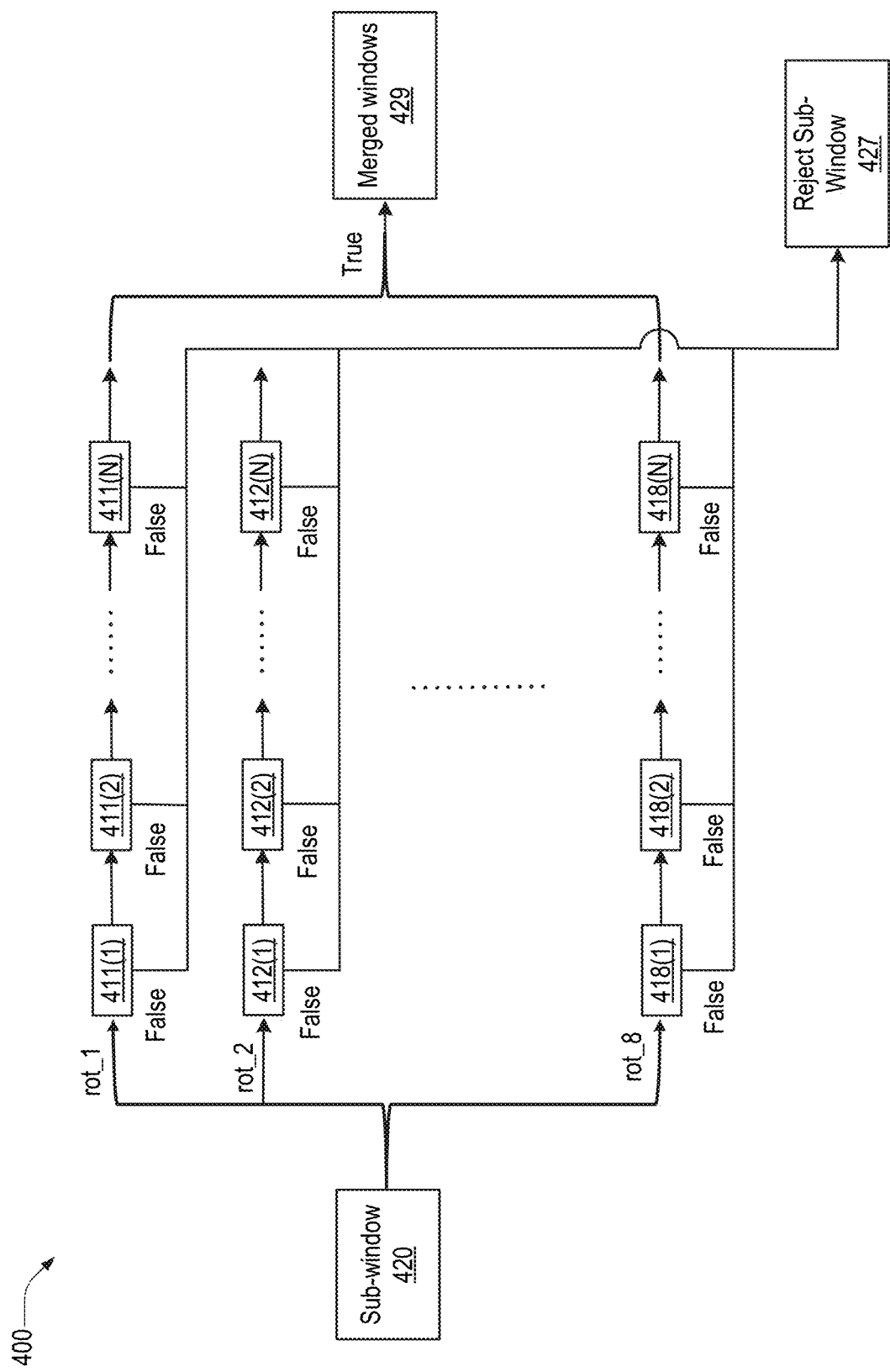
FIG. 4 shows an exemplary diagram illustrating classifiers run on image pixel pairs for sub-windows, in an embodiment.

FIG. 4 shows an exemplary diagram 400 illustrating classifiers run on image pixel pairs for sub-windows. FIG. 4 shows an image sub-window 420, which is an example of sub-window 120 in FIG. 1, being evaluated by strings of classifiers at various angles of rotation, rot_1-rot_8. In this case, each string of classifiers are N elements long, N being the number of sub-windows along a path (e.g., path 160, FIG. 1) through an image, at each angle of rotation. There is a string of classifiers for each rotated position of the image (not shown), in this case eight distinct rotations. Rotation one (rot_1) has N classifiers 411(1) to 411(N); rotation two (rot_2) has N classifiers 412(1) to 412(N); rotation eight (rot_8) has N classifiers 418(1) to 418(N). Each classifier tests whether there is a facial feature, and any failing classifier is rejected to rejected sub-window 427. If a classifier passes a test (e.g., "true") the classifier is transmitted to merged windows 429. Each classifier represents a full binary tree.

Figure 5:
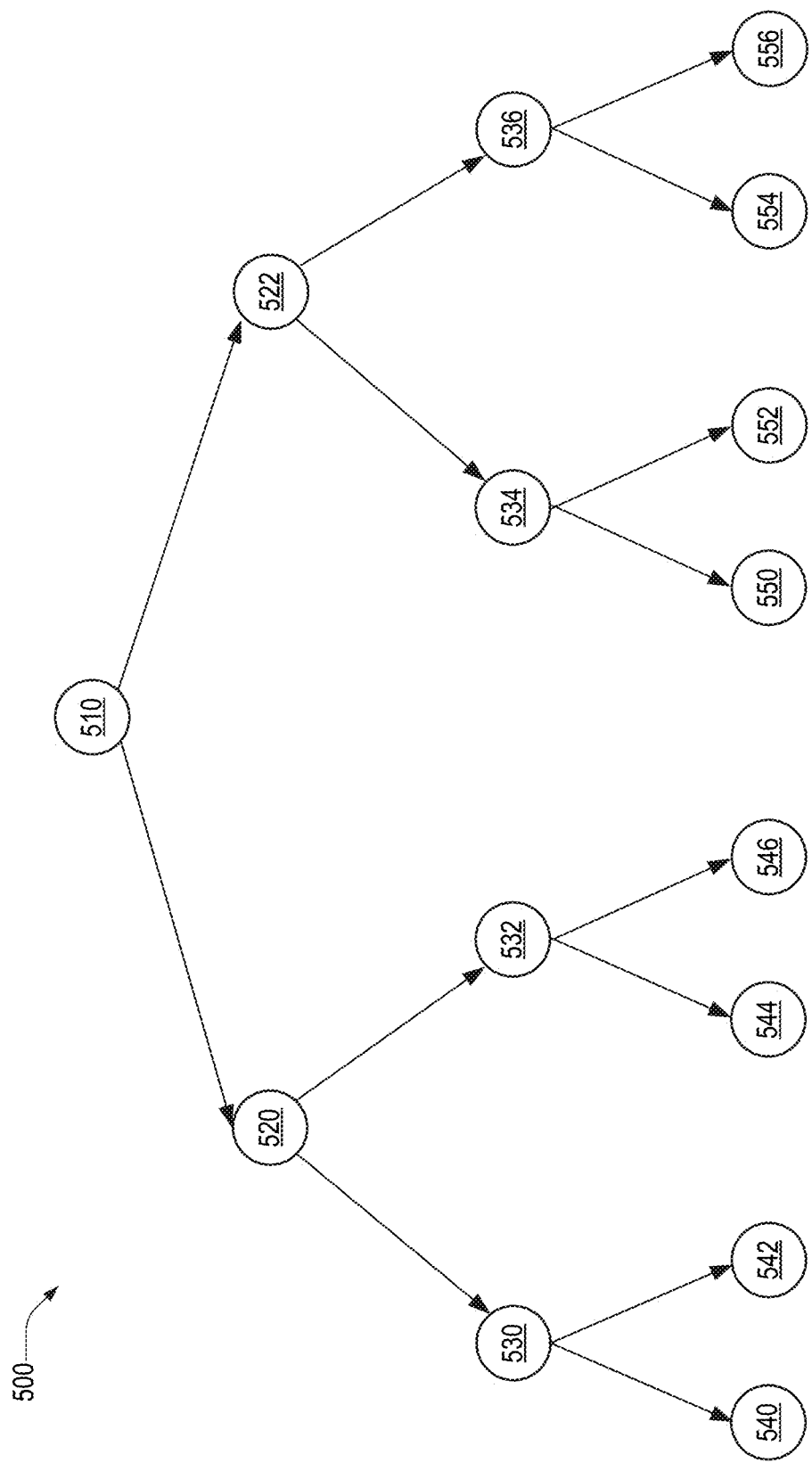
FIG. 5 shows an example of full binary tree implemented by each of the classifiers of FIG. 4, in an embodiment.

FIG. 5 shows an example of a full binary tree implemented by each of the classifiers of FIG. 4. Each sub-window from FIG. 4 (e.g., 411(1), 411(2), . . . , 411(N), and so on) is run through a binary tree, graph 500. Each node produces two offspring while the bottom collection of leaf nodes 540, 542, 544, 546, 550, 552, 554, 556 are childless. The top node 510 represents a comparison between subtraction of pixel pairs (a1)-(a2) and a predetermined first threshold. For example, node 510 determines whether a difference between a1 and a2 satisfies (e.g., is greater than, less than, or equal to) the first threshold. If the difference satisfies (e.g., is greater than, less than, or equal to) the first threshold, the image is rejected. However, if node 510 returns that the difference is greater than the first threshold, graph 500 may proceed to node 522.

Nodes 520, 522 determine whether the difference between pixel pair (b1, b2) satisfies (e.g., is greater than, less than, or equal to) a second threshold. If either of node 520, 522 determines the difference between pixel pair (b1, b2) is less than the second threshold, the image is rejected. However, if either of node 520, 522 determines the difference between pixel pair (b1, b2) satisfies (e.g., is greater than, less than, or equal to) the second threshold, graph 500 may proceed to nodes 530, 534, respectively. Nodes 530, 532, 534, 536 of graph 500 determine whether the difference between pixel pair (c1, c2) is less than a third threshold. If the difference satisfies (e.g., is greater than, less than, or equal to) the third threshold, the image is rejected. However, if the difference is greater than the third threshold, graph 500 may proceed to one of nodes 540, 544, 550, 554. If one of nodes 540-556 determine a value satisfies (e.g., is greater than, less than, or equal to) a fourth threshold, the corresponding classifier determines that the object within the sub-window is a face. The value of the fourth threshold may be a summation of each of the differences between respective pixel pairs at each node of graph 500. For example, the value compared to the fourth threshold may be the absolute value of a1 subtracted from a2 added to the absolute value of b1 subtracted from b2 added to the absolute value of c1 subtracted from c2.

The sub-window that includes a face will be merged (merge windows 429) with other sub-windows that the classifier determines includes a face. However, if the value is less than the fourth threshold, graph 500 determines there is no object within the sub-window being classified and rejects the sub-window (reject sub-window 427). When the sub-window passes all of the classifiers and results with a positive determination of representing a face, the sub-window is accumulated with the other sub-windows that also pass the test.

Figure 6:
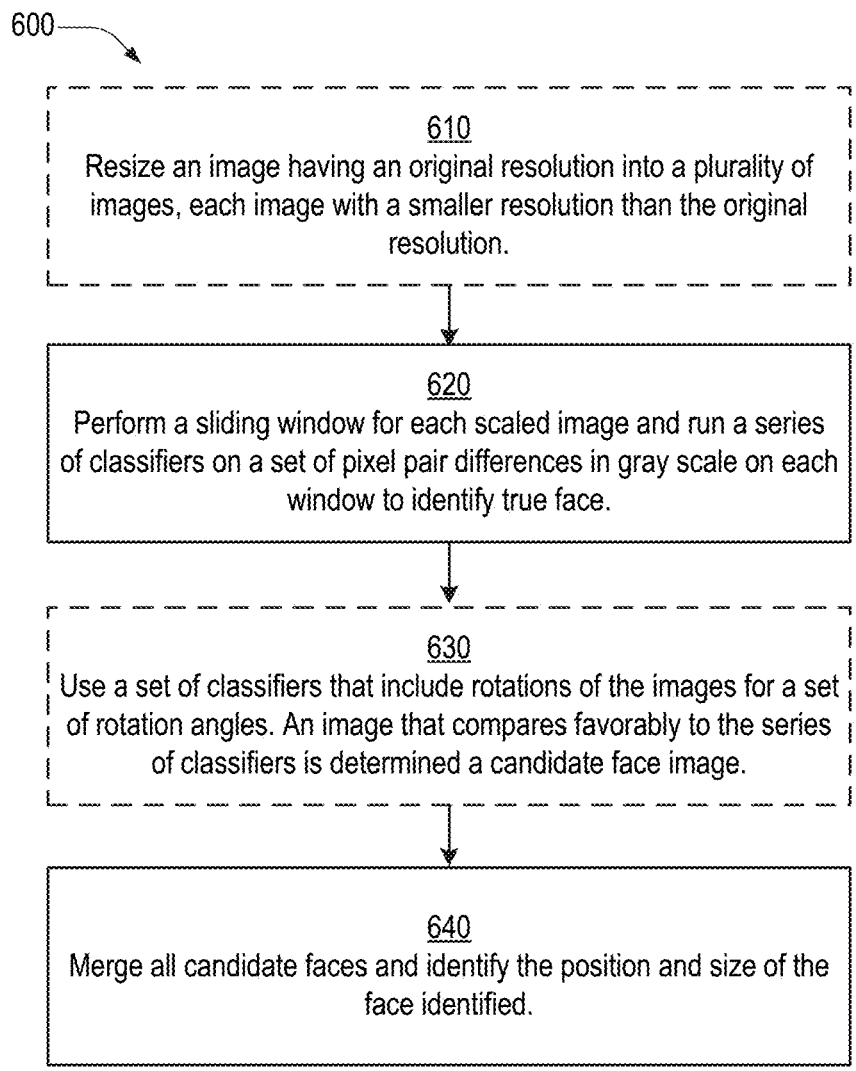
FIG. 6 is a flowchart illustrating a method for face detection within a captured image, in an embodiment.

FIG. 6 shows a flowchart illustrating a method for face detection within a captured image. In block 610, the method resizes an image having an original resolution into at least one image, each image with a lower resolution than the original resolution. In one example of block 610, image 110 is resized to at least one of images 112, 114, and 116. In block 620, a sliding window is performed so that a sub-window of an image, such as the original image or that at least one image with lower resolution is presented to a series of classifiers by using a set of pixel pair differences in grayscale in order to identify a true face. In one example of block 620, the sliding window begins with sub-window 120, and is directed along path 160 through image 116, ending at sub-window 121. Each of the sub-windows within the sliding window has corresponding pixel pairs. In this example of block 610, each of the sub-windows are presented to series of trained classifiers, as shown in FIG. 4. Optional block 630 uses classifiers where the image is classified using different angles of rotation. In one example of block 630, an image has a set of rotations (e.g., rotated images 310(1)-(8); FIG. 3); corresponding sub-windows for each rotated image is presented to a corresponding series of classifiers, as shown in FIG. 4. In block 640, each of the images from the collection of sub-windows that are identified as facial are merged. In one example of block 640, once a classifier returns true for a sub-window, as discussed in FIG. 4, each of the images from the collection are merged. From the composite of images the size and location of the face are identified.

Figure 7:
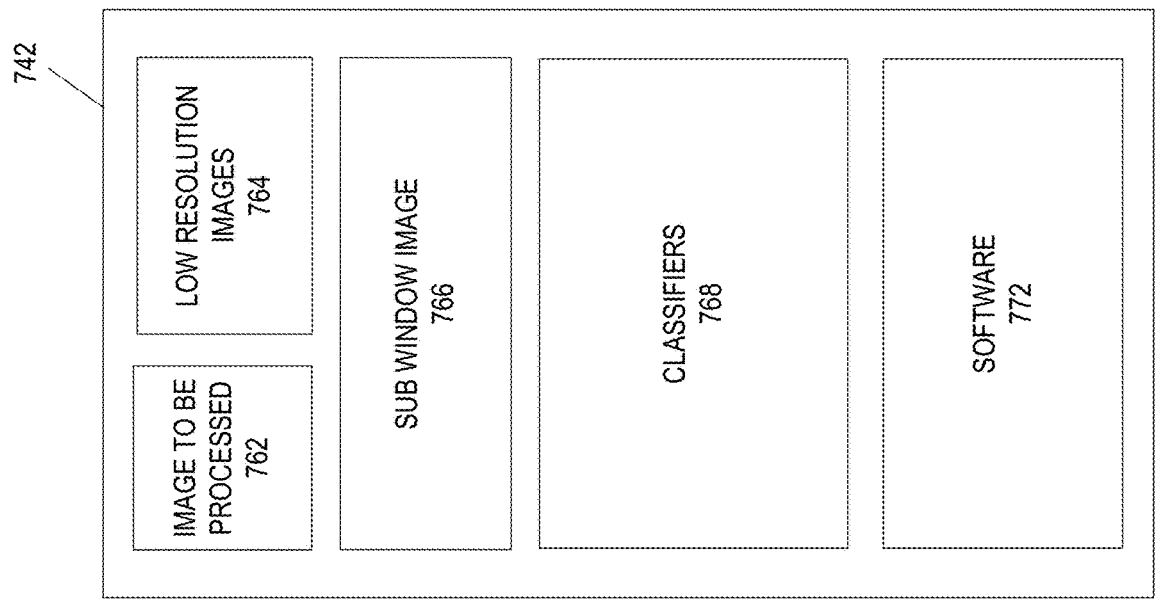
FIG. 7 is a block diagram of an example computer apparatus, in an embodiment.
Figure 7:
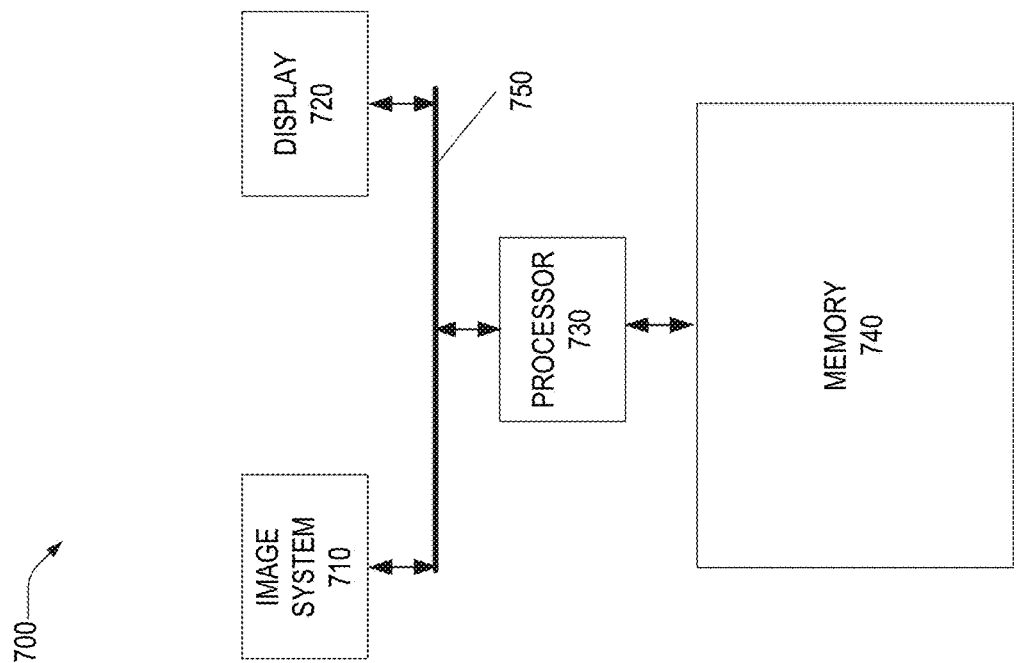

FIG. 7 is a block diagram of an example computer apparatus 700, according to an embodiment. The block diagram shows computing apparatus 700 with an image system 710, a display 720, a processor 730, and a memory 740. Memory 740 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 740 may be integrated into processor 730.

Memory 740 stores non-transitory computer-readable instructions as software 772. When executed by processor 730, software 772 causes processor 730 to implement the functionality of the facial recognition as described herein. Software 772 may be, or include, firmware. The image system 710 presents an image (e.g., image 101, 216, 310, and so on) for facial recognition processing and delivers the information via a data bus 750. Processor 730 stores the image in memory 740 and processes it. A memory map 742 is shown. The image is stored in location 762 of memory 740. The image within memory location 762 may be processed into a series of lower resolution images within memory location 764 where each subsequent image has a lower resolution than the prior image. From the lower resolution image, a small sub-window image is stored in the memory location 766. Pixel pairs are taken from the sub-window in memory location 766 and pixel pairs are extracted from the sub-window. The pixel pairs are processed by comparing them against classifiers which are stored in memory area 768. Examples of classifiers are shown in FIG. 4.

This details an example overview of the present embodiments, as discussed above. A user requests to access their smart phone and their smart phone requests biometric data, in the form of facial recognition, to determine the user is authorized to access contents of the smart phone. The user may capture a picture of his face with the smart-phone camera. Depending on a resolution of the captured image, the smart phone may resize the captured image to a new resolution that requires fewer computing resources to implement the present embodiments. For example, the captured image resolution is 120×160, and the scaling image size is with a scale factor of 1.25 by bi-linear interpolation for down-sampling. The smart phone may then, using the original or new captured image of the user's face, perform the sliding window (as discussed with reference to FIGS. 1, 2), using the sub-windows to traverse the captured image. Each sub-window, and their respective rotated angles (as discussed with reference to FIG. 3), traversing the captured image may be input to classifiers (as described with reference to FIGS. 4, 5). Each of the trained classifiers that determine corresponding sub-window pixel pairs include a differential (as discussed with reference to FIG. 5) indicative of a particular object (e.g., a face) may return true. And each of the sub-windows that include the user's face may be merged into a single window that includes the user's entire (or approximately entire) face. This merged window may be compared to a look-up-table to determine whether the user is an authenticated user.

Figure 8:
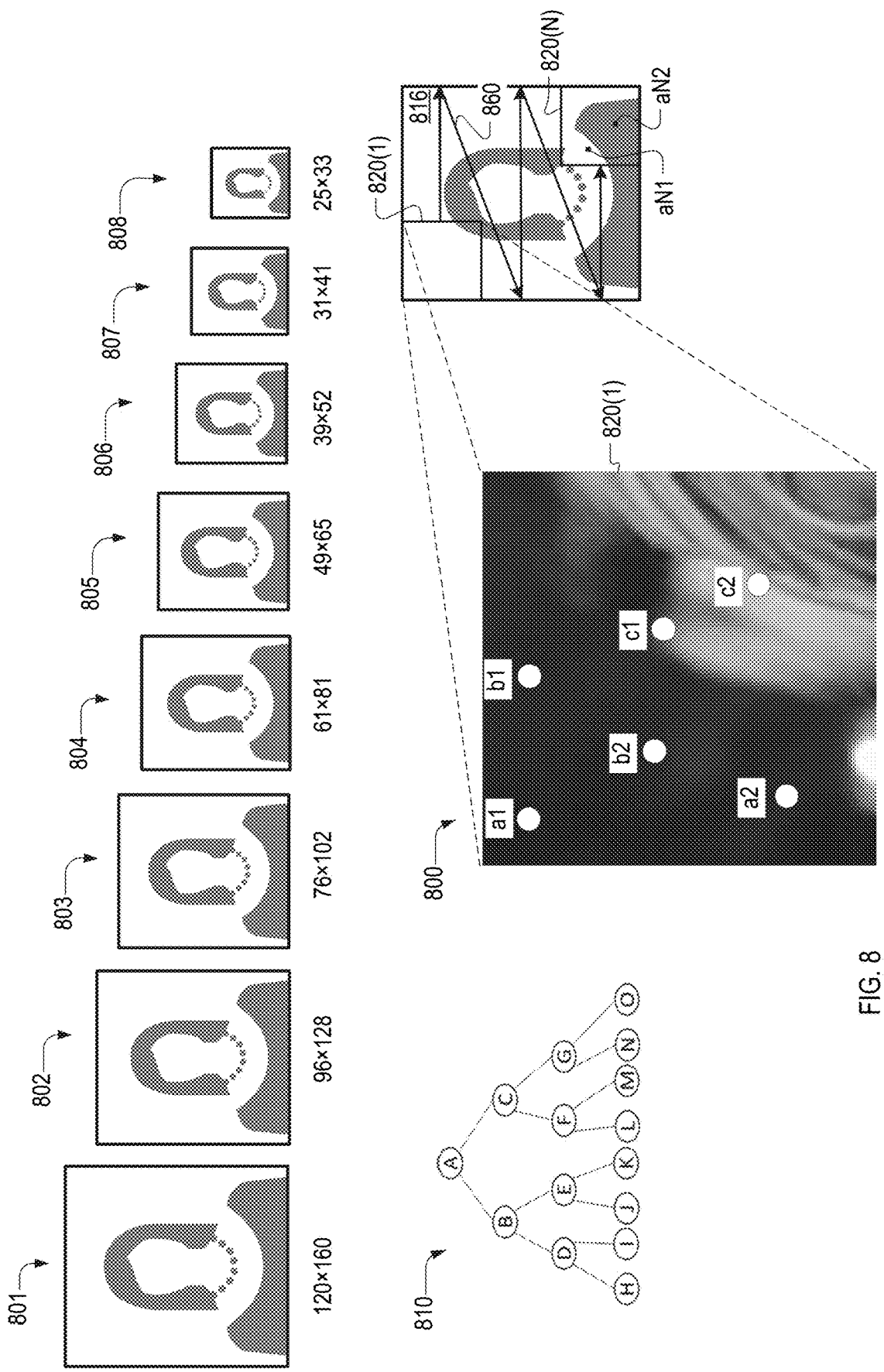
FIG. 8 illustrates an example diagram summarizing the present embodiments.

FIG. 8 illustrates an example overview of the present embodiments, as discussed above. As object detection is possible with images having either high or low resolutions, the resolution of a final scaled image may be of any resolution. Here, for example, using image 801 as an input resolution of 120×160, and having a scaling image size with a factor of 1.25 by bi-linear interpolation for down-sampling. As shown in FIG. 8, processing starts with image 801 with resolution 120×160. Scaling of image 801 results in images 802, 803, 804, 805, 806, 807, and 808, having resolutions 96×128, 76×102, 61×81, 49×65, 39×52, 31×41, 25×33, respectively. As discussed in FIG. 2, at least one sliding sub-window 820(1)-(N) of an image 816 is used to acquire sub-window data and may have a resolution (such as 24×24) that is the same as a training window (e.g., a sub-window used to train classifiers). The classifier, as discussed in at least FIGS. 4 and 5, runs on each sub-window to decide whether the respective pixel pairs, such as (a1, a2), (b1, b2), (c1, c2), indicate an object (e.g., a face) is within the sub-window. In other words, image data, with a location of (y, x) and a sliding step of (y, x), are run through the classifiers of at least FIGS. 4 and 5. Data in a 24×24 format is then outputted. Classifiers are run on each pixel pairs of the sub-windows 820. Example input to an algorithm includes window data, number of classifiers used, feature indexes, and classifier data. Each classifier is a binary tree such as 810 and the pixel pairs are used by the classifiers. The algorithm outputs whether the image is a face or not.

The concatenated classifiers are run the on the inputted data to get a confidence score if the score is less than at least one threshold (e.g., as discussed with reference to FIG. 5) the image is rejected otherwise the next classifier is run. The sliding window moves to the next space, along the path 860 and then run again. Data that passes classifier tests (greater than at least one threshold) are concatenated into a single concatenated confidence score. If the concatenated confidence score is larger than the threshold, then it is a face, otherwise the image is rejected.

Figure 9:
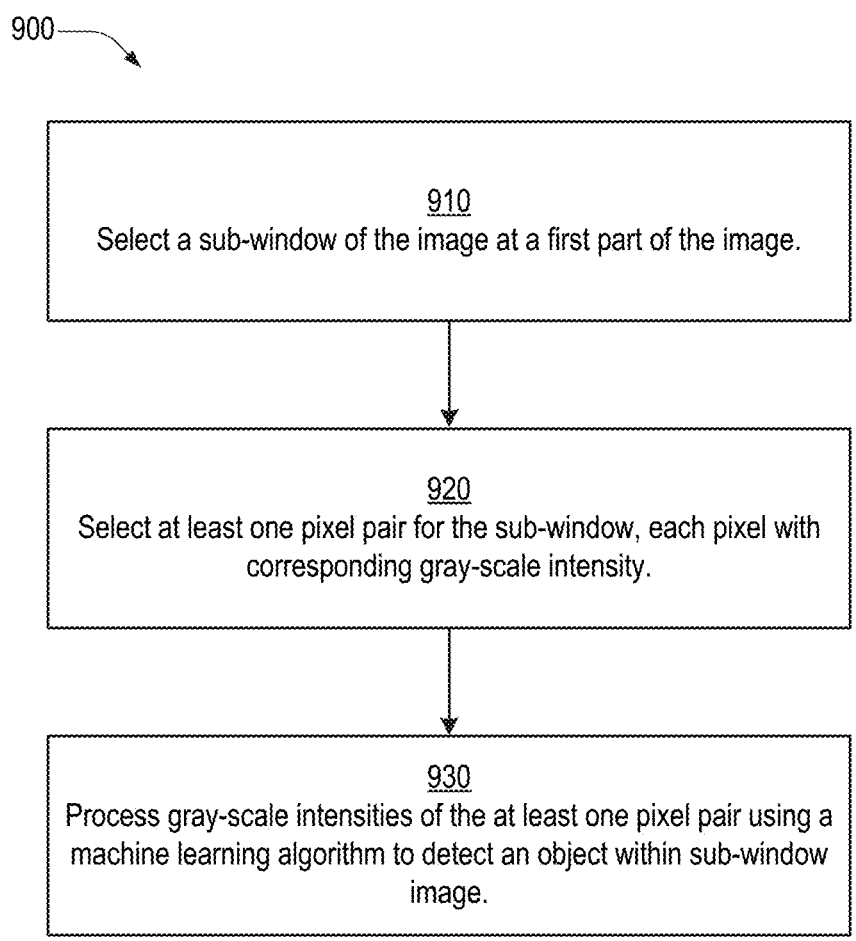
FIG. 9 is a flowchart illustrating a method for detecting an object within an image using an image processor, in an embodiment.

FIG. 9 is a flow chart illustrating a method 900 for detecting an object within an image using an image processor. Block 910 includes selecting a sub-window of the image at a first part of the image. In one example of block 910, image processor 730 selects sub-window 220(1) of image 216. Block 920 includes selecting at least one pixel pair for the sub-window, each pixel with a corresponding grayscale intensity. In one example of block 920, processor 730 selects at least pixel pair 230(1), (2), and may also select pixel pairs 232(1), (2) and 234(1), (2). Block 930 includes processing grayscale intensities of the at least one pixel pair using a machine learning algorithm to detect an object within the sub-window. In one example of block 930, processor 730 inputs the at least one pixel pair 230(1), (2) to the machine learning algorithm (e.g., string of classifiers in FIG. 4 and graph 500 in FIG. 5) to detect the object within the sub-window.

In an embodiment, the sub-window is moved to a second part of the image and the steps of selecting and processing are repeated. In an embodiment, the machine learning algorithm comprises a series of classifiers, each classifier compares the selected pair to a set of thresholds. In an embodiment, the machine learning algorithm further comprises determining differences in grayscale intensity for each of the plurality of pixel pairs at each sub-window. In an embodiment, the object is a human face.

In an embodiment, method 900 may further include rotating the sub-window by a predetermined angle before using the machine learning algorithm to process the selected grayscale intensity. In an embodiment, wherein a size of the sub-window is predetermined. In an embodiment, method 900 may further include resizing the image into a sub-image having a lower resolution than the original resolution. In an embodiment, method 900 may further merging the selected sub-window with other sub-windows that include a detected object using the machine learning algorithms; comparing the merged sub-windows to a look-up-table; and determining, responsive to the comparison satisfying a threshold, that the object within the merged windows matches an object within the look-up-table. In yet another embodiment, the first part of the image and the second part of the image do not overlap.

This paragraph details an example overview of the present embodiments, as discussed above. When a user requests an access to a smart phone, the smart phone may request biometric data, in the form of facial recognition, to determine whether the user is authorized to access the contents of the smart phone. The user may capture a picture of her face with the smart-phone camera. Depending on the resolution of the captured image, the smart phone may resize the captured image to a new resolution that requires fewer computing resources to implement the present embodiments. For example, a captured image with a resolution of 120×160 pixels may be down-sized to a resolution of 25×33 pixels by using, for example, a bi-linear interpolation. The smart phone may then, using the original or newly captured image of the user's face, perform the sliding window (as discussed with reference to FIGS. 1, 2), using the sub-windows to traverse the captured image. Each sub-window, and its respective rotated angles (as discussed with reference to FIG. 3), traversing the captured image, may be input to classifiers (as described with reference to FIGS. 4, 5). Each of the trained classifiers that determine corresponding sub-window pixel pairs include a differential, as discussed with reference to FIG. 5, that may be indicative of a particular object (e.g., a face), returning true. Each of the sub-windows that include the user's face may be merged into a single window that includes the user's entire (or approximately entire) face. This merged window may be compared to a look-up-table to determine whether the user is an authenticated user.

Figure 10:
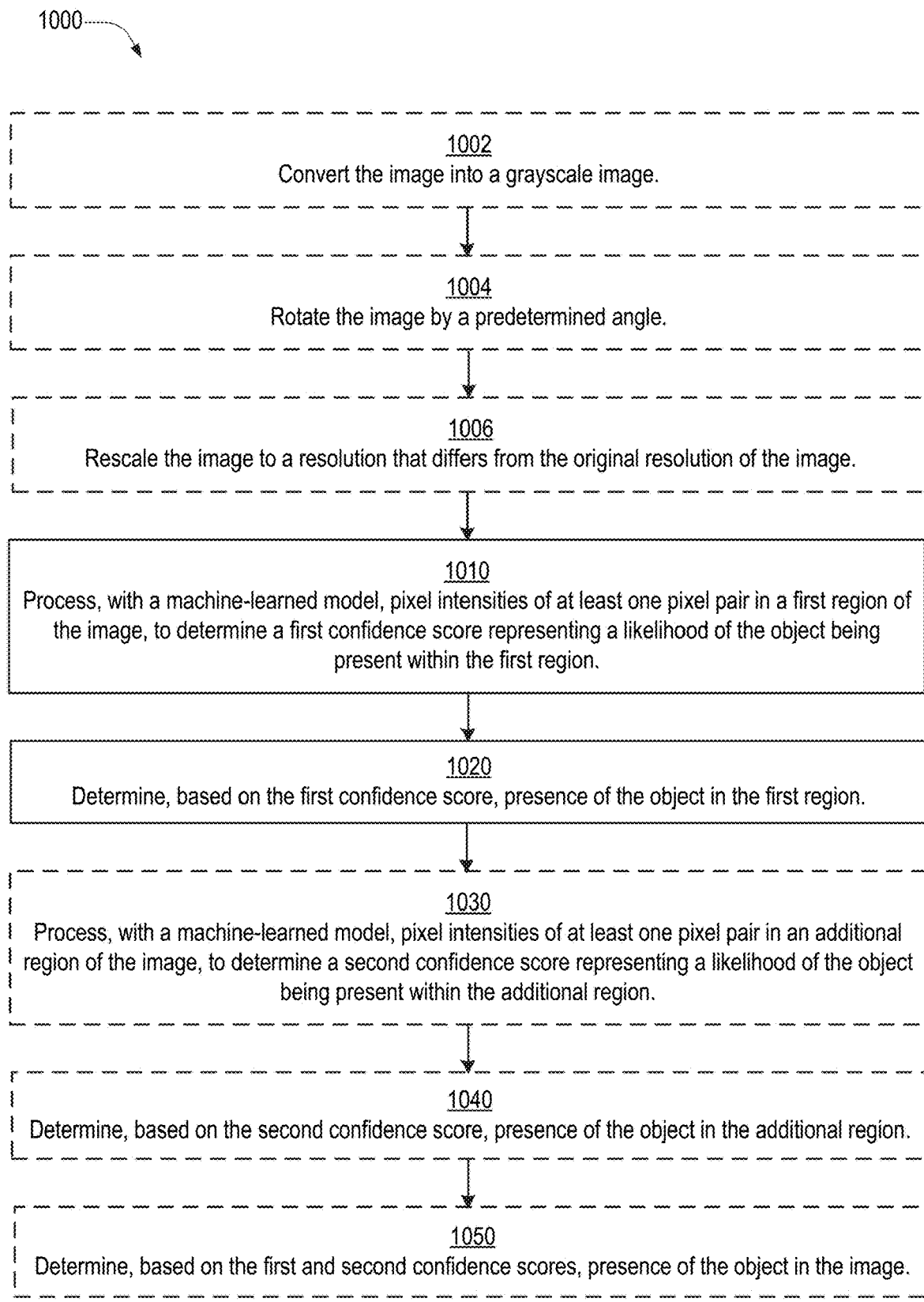
FIG. 10 is a flowchart illustrating a method for detecting an object within an image, in an embodiment.

FIG. 10 is a flowchart illustrating a method 1000 for detecting an object within an image. In embodiments, method 1000 is implemented within one or more aspects of computer apparatus 700, FIG. 7. In embodiments, method 1000 is implemented by processor 730 executing computer-readable instructions stored in software 772. Method 1000 includes steps 1010 and 1020. Method 1000 may also include one or more of steps 1002, 1004, 1006, 1030, 1040, and 1050. Each step 1002, 1004, and 1006, when performed, is performed prior to step 1010.

Step 1002 includes converting the image into a grayscale image. In an example of step 1002, image 101 in FIG. 1 is converted into a grayscale image prior to further processing. Step 1004 includes rotating the image by a predetermined angle. In an example of step 1004, images 310(1) to 310(8) in FIG. 3 show eight predetermined angles to which the original image is rotated. Step 1006 includes rescaling the image to a resolution that differs from the original resolution of the image. In an example of step 1006, image 801 in FIG. 8 is rescaled to from the original resolution of 120×160 to a series of smaller resolution images 802, 803, 804, 805, 806, 807, and 808, with the resolution of image 808 being 25×33.

Step 1010 includes processing, with a machine-learned model, pixel intensities of at least one pixel pair in a first region of the image, to determine a first confidence score representing a likelihood of the object being present within the first region. In an example of step 1010, in sub-window 820(1) in FIG. 8, which is a first region of image 816, pixel intensities of pixel pairs (a1, a2), (b1, b2), and (c1, c2) are used as an input to a machine-learning model to obtain a confidence score that an object, such as a face, is present in sub-window 820(1). Step 1020 includes determining, based on the first confidence score, presence of the object in the first region. In an example of step 1020, the first confidence score obtained in step 1010 is compared with a threshold, which determines whether the object (e.g., a face) is present in sub-window 820(1).

Step 1030 includes processing, with a machine-learned model, pixel intensities of at least one pixel pair in an additional region of the image, to determine a second confidence score representing a likelihood of the object being present within the additional region. The machine-learned model may be the same machine-learned model of step 1010. In an example of step 1030, sub-window 820(N) in FIG. 8 examines a different region of image 816 from sub-window 820(1). In sub-window 820(N), pixel intensities of a pixel pair (aN1, aN2) shown in sub-window(N) are an input to the machine-learned model to obtain a second confidence score that the object, such as a face, is present in sub-window(N). Pixel intensities of additional pixel pairs in sub-window(N) may also be input to the machine-learned model. Step 1040 includes determining, based on the second confidence score, presence of the object in the additional region. In an example of step 1040, the second confidence score is compared to the threshold described in step 1020 to determine whether the object (e.g., a face) is present in sub-window 820(i).

Step 1050 includes determining, based on the first and second confidence scores, presence of the object in the image. In an example of step 1050, the concatenated confidence score, described with reference to FIG. 8, is compared with the threshold described in step 1020 to determine whether the object (e.g., a face) is present in image 816. The concatenated confidence score may be the greater of the first confidence score of step 1010 and the second confidence score of step 1030.

Combinations of Features

Features described above as well as those claimed below may be combined in various ways without departing from the scope hereof. The following enumerated examples illustrate some possible, non-limiting combinations:

(A1) A method of detecting an object in an image includes (i) processing, with a machine-learned model, pixel intensities of a pixel pair in a first region of the image, to determine a first confidence score representing a likelihood of the object being present within the first region, and (ii) determining, based on the first confidence score, presence of the object in the first region.

(A2) In embodiments of method (A1), the method further includes (i) processing, with the machine-learned model, pixel intensities of a pixel pair in an additional region of the image, to determine a second confidence score representing a likelihood of the object being present within the additional region, and (ii) determining, based on the second confidence score, presence of the object in the additional region.

(A3) In embodiments of method (A2), the method further includes determining, based on the first and second confidence scores, presence of the object in the image.

(A4) In embodiments of either of the methods (A2) and (A3), the first region and the additional region do not overlap.

(A5) In embodiments of any of the methods (A1)-(A4), said step of processing includes processing pixel intensities of a plurality of additional pixel pairs.

(A6) In embodiments of any of the methods (A1)-(A5), the method further includes converting the image into a grayscale image prior to the step of processing.

(A7) In embodiments of method (A6), said step of processing includes determining a difference between the pixel intensities.

(A8) In embodiments of method (A7), the machine-learned model includes a series of classifiers, where each classifier compares the difference to a set of thresholds.

(A9) In embodiments of any of the methods (A1)-(A8), the method further includes rotating the image by a predetermined angle prior to the step of processing.

(A10) In embodiments of any of the methods (A1)-(A9), the method further includes, prior to the step of processing, rescaling the image to a resolution different from the original resolution of the image.

(B1) A system for detecting an object within an image includes a processor and a memory. The memory is communicatively coupled with the processor and includes storing machine-readable instructions that, when executed by the processor, cause the processor to execute any one of methods (A1)-(A10).

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

The invention claimed is:

1. A method of detecting an object in an image, comprising:
    processing, with a machine-learned model, pixel intensities of a pixel pair in a first region of the image, to determine a first confidence score representing a likelihood of the object being present within the first region; and
    determining, based on the first confidence score, presence of the object in the first region.

2. The method of claim 1, further comprising:
    processing, with the machine-learned model, pixel intensities of a pixel pair in an additional region of the image, to determine a second confidence score representing a likelihood of the object being present within the additional region; and
    determining, based on the second confidence score, presence of the object in the additional region.

3. The method of claim 2, further comprising:
    determining, based on the first and second confidence scores, presence of the object in the image.

4. The method of claim 2, wherein the first region and the additional region do not overlap.

5. The method of claim 1, wherein said processing includes processing pixel intensities of a plurality of additional pixel pairs.

6. The method of claim 1, further comprising converting the image into a grayscale image prior to the step of processing.

7. The method of claim 6, wherein said processing includes determining a difference between the pixel intensities.

8. The method of claim 7, wherein the machine-learned model includes a series of classifiers, each classifier compares the difference to a set of thresholds.

9. The method of claim 1, further comprising rotating the image by a predetermined angle prior to the step of processing.

10. The method of claim 1, further comprising, prior to the step of processing, rescaling the image to a resolution that differs from an original resolution of the image.

11. A system for detecting an object within an image, comprising:
a processor; and
a memory communicatively coupled with the processor and storing machine-readable instructions that, when executed by the processor, cause the processor to:
process, with a machine-learned model, pixel intensities of a pixel pair in a first region of the image, to determine a first confidence score representing a likelihood of the object being present within the first region; and
determine, based on the first confidence score, presence of the object in the first region.

12. The system of claim 11, the memory further storing machine-readable instructions that, when executed by the processor, further cause the processor to:
process, with the machine-learned model, pixel intensities of a pixel pair in an additional region of the image, to determine a second confidence score representing a likelihood of the object being present within the additional region; and
determine, based on the second confidence score, presence of the object in the additional region.

13. The system of claim 12, the memory further storing machine-readable instructions that, when executed by the processor, further cause the processor to determine, based on the first and second confidence scores, presence of the object in the image.

14. The system of claim 12, wherein the first region and the additional region do not overlap.

15. The system of claim 11, the memory further storing machine-readable instructions that, when executed by the processor, further cause the processor to, when processing the pixel intensities of the pixel pair, process pixel intensities of a plurality of additional pixel pairs.

16. The system of claim 11, the memory further storing machine-readable instructions that, when executed by the processor, further cause the processor to convert the image into a grayscale image prior to said processing.

17. The system of claim 16, the memory further storing machine-readable instructions that, when executed by the processor, further cause the processor to, when processing said pixel intensities, determine a difference between the pixel intensities.

18. The system of claim 17, wherein the machine-learned model includes a series of classifiers, each classifier compares the difference to a set of thresholds.

19. The system of claim 11, the memory further storing machine-readable instructions that, when executed by the processor, further cause the processor to rotate the image by a predetermined angle prior to said processing.

20. The system of claim 11, the memory further storing machine-readable instructions that, when executed by the processor, further cause the processor to, prior to processing, rescale the image to a resolution that differs from an original resolution of the image.

* * * * *